United States Patent [19]

Osman

[11] 4,122,026
[45] Oct. 24, 1978

[54] LIQUID CRYSTAL MIXTURES

[75] Inventor: Maged A. Osman, Zürich, Switzerland

[73] Assignee: BBC Brown, Boveri & Company Limited, Baden, Switzerland

[21] Appl. No.: 793,773

[22] Filed: May 4, 1977

[30] Foreign Application Priority Data

May 4, 1976 [CH] Switzerland .......................... 5548/76

[51] Int. Cl.[2] ............................ C09K 3/34; G02F 1/13
[52] U.S. Cl. .................................... 252/299; 252/408;
350/350; 260/465 E; 260/465 D; 260/566 R;
260/205; 260/207.1; 260/576; 260/578;
260/562 P; 260/456 A; 560/19; 560/20;
560/11; 560/49
[58] Field of Search ............................. 252/299, 408;
350/160 LC, 350, 349

[56] References Cited

U.S. PATENT DOCUMENTS

| | | | |
|---|---|---|---|
| 3,796,479 | 3/1974 | Helfrich et al. ..................... | 252/299 |
| 3,853,785 | 12/1974 | Labes ..................................... | 252/408 |
| 3,983,049 | 9/1976 | Aftergut et al. ..................... | 252/299 |
| 3,988,054 | 10/1976 | Yaguchi et al. ..................... | 252/299 |
| 4,011,173 | 3/1977 | Steinstrasser ........................ | 252/299 |
| 4,027,950 | 6/1977 | Moriyama et al. .................. | 252/299 |

FOREIGN PATENT DOCUMENTS

2,309,509  11/1976  France .................................... 252/299

OTHER PUBLICATIONS

Dave, J. S., et al., J. Chem. Soc. (A), pp. 1473–1478 (1967).
Bloom, A., et al., Mol. Cryst. Liq. Cryst., vol. 41, pp. 1–4 (1977).

Primary Examiner—Richard E. Schafer
Assistant Examiner—T. S. Gron

Attorney, Agent, or Firm—Oblon, Fisher, Spivak, McClelland & Maier

[57] ABSTRACT

A nematic liquid crystal mixture comprises at least one nematic liquid crystal compound and an amount, sufficient to impart a positive DC anisotropy of at least about 15 to said mixture, of at least one liquid crystalline or potentially liquid crystalline compound having a positive DC anisotropy of above about 25, of the formula (1)

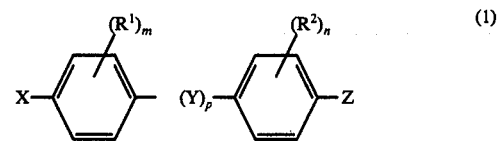

wherein X is a monovalent radical of the formula $-NR^3R^4$ or $-N(R^5)(CHO)$; Y is a bivalent radical of the formula $-CH=N-$, $-N=CH-$, $-N=N-$, $-CH=CH-$, $-C(O)O-$, $-O(O)C-$, $-C(O)S-$, $-S(O)C-$, $-C\equiv C-$ or

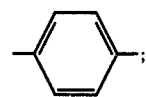

Z is a monovalent radical of the formula $-CN$, $-NO_2$, $-SO_2CH_3$, $-SO_2CF_3$ or $-NHCOR^5$; $R^1$ and $R^2$ are the same or different and each is fluorine, chlorine, bromine, methyl or hydroxy; $R^3$ and $R^4$ are the same or different and each is hydrogen or an alkyl group containing from 1 to 8 carbon atoms; $R^5$ is an alkyl group containing from 1 to 8 carbon atoms; $p$ is zero or 1; and $m$ and $n$ are the same or different integers from zero to 4.

16 Claims, No Drawings

LIQUID CRYSTAL MIXTURES

BACKGROUND OF THE INVENTION

1. Field of the Invention

This invention relates to liquid crystal mixtures having desirable positive DC anisotropy.

2. Description of the Prior Art

Numerous compounds have already been proposed for use in liquid crystal displays. These generally correspond to the formula:

$$X - A - Y - A - Z \quad (10)$$

in which A represents bivalent aromatic radicals, for example, benzene nuclei, which are connected together by a bridge member Y and have in the $p$ or $p'$ position an "electron repelling" radical X or an "electron attracting" radical Z. Thus, for example, from DT-OS 2, 306, 738 and 2, 443, 618, liquid crystal compounds of this structure are known in which two benzene nuclei A are joined together by way of the groups —CH=N, —C(O)O— or —CH=CHC(O)O— as bridge member Y, and in which in the $p$ or $p'$ position carries as group X an alkyl radical containing up to 8 or 10 carbon atoms and, as group Z, the nitrile group —CN.

By liquid crystals (LC) are generally understood those compounds which in the solid/liquid transition, have an anisotropic liquid phase in which the molecule is oriented nematically or smectically.

For details in this regard reference is made to the previously mentioned German patent specifications or to the literature mentioned therein.

For known twisted nematic displays it is preferred to use those liquid crystals which have positive DC anisotropy in the sense that the dielectric constant (DC) parallel to the axis of the molecule ($\epsilon_\parallel$) is greater than the dielectric constant perpendicular to the axis of the molecule ($\epsilon_\perp$). These dielectric constants are, for example, measured by the method described in Z. Naturforschung 29a (1974) 905, and the magnitude of the difference $\Delta\epsilon = \epsilon_\parallel - \epsilon_\perp$ is a measure of the magnitude of the positive DC anisotropy.

Some nematic LC mixtures with positive DC anisotropy are known from DT-OS 2, 321, 632 and consist of (a) nematic compounds of the formula (11):

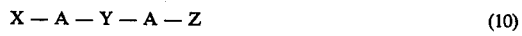

in which A' represents the azoxy or carbonyloxy group and X' and Z' represent the same or different alkyl or alkoxy radicals containing 1 to 8 carbon atoms in a straight chain, and (b) compounds of the formula (12):

$$X'' - A'' - Y'' \quad (12)$$

in which A'' represents one of the radicals

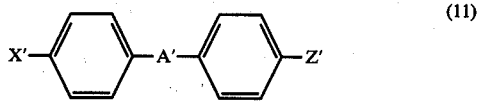

X'' represents an n-alkyl radical containing 4 to 9 carbon atoms or a dialkylamino radical containing from 2 to 4 carbon atoms; and Y'' represents the cyano, nitro, or trifluoromethyl group; and, optionally, (c) compounds of the formula (13):

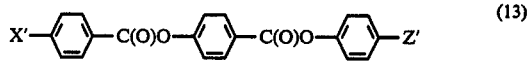

in which X' and Z' are the same as for formula (11).

The compounds of formula (11) have negative or very weakly positive ($\Delta\epsilon < 2$) DC anisotropy and are mixed with compounds (12) in order to obtain a mixture having overall a clearly positive ($\Delta\epsilon > 2$) DC anisotropy. Since the compounds (12) are not liquid crystals, their use in large proportions leads to a lowering of the clarification point of the LC mixture which precludes practical utilization. When small amounts are added, only moderately high positive DC anisotropy values ($\Delta\epsilon$) of at most about 15 can be achieved, thus necessitating operating voltages of about 3 V for displays using LC mixtures of this kind.

In DT-OS 2, 518, 725, LC mixtures having overall positive DC anisotropy are described. These consist of nematic LC compounds having negative DC anisotropy and containing additions of less than 15% of compounds of the formula (14):

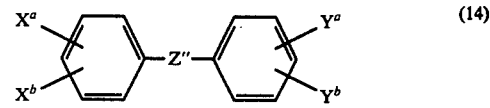

which are not liquid crystals. Z'' represents a single bond, an oxygen bridge, or one of the groups —CH=N, —C(O)O—, —N=HC—, or —O(O)C—; $X^a$ and $X^b$ represent hydrogen or chlorine atoms, or nitrile, nitro or carboxy groups; and $Y^a$ and $Y^b$ are hydrogen atoms, or amino, hydroxy, alkyl, alkoxy, alkylamino or dialkylamino groups; while at least one of the substituents $X^a$, $X^b$, $Y^a$ and $Y^b$ is a polar group and none of these substituents is in the ortho position. Specific values for the DC anisotropy of the added compounds (14), which in DT-OS 2, 518, 725 are referred to throughout as isotropic, are not given in that specification.

The prior art in connection with nematic LC mixtures having overall positive DC anisotropy can thus be summarized by stating that nematic LC compounds which have negative or at most very slightly positive ($\Delta\epsilon \sim 0.5$) DC anisotropy, have been combined with isotropic compounds to form mixtures which have an overall moderately high positive DC anisotropy of less than 15, and, accordingly, need operating voltages of 3 V or higher.

For the practical operation of displays such as are used, for example, in digital watches, it is important that the operating voltage of the liquid crystals should be compatible with conventional small or very small batteries. For the reasons indicated above, known twisted nematic displays require operating voltages of at least 3 V. That is to say, batteries are required which comprise at least two cells of 1.5 V each, or else current transformers must be used in order to obtain the operating voltage from such a single-cell battery.

It would, therefore, be highly desirable to have available liquid crystal mixtures which have so high a positive DC anisotropy that they can be operated directly with single-cell batteries, i.e., with operating voltages of about 1.5 V. Since the operating voltage is proportional to the threshold voltage ($U_s$) and the latter is dependent on the value of the DC anisotropy, the LC mixture would need to have an adequately high overall DC anisotropy of at least about 15, preferably about 25. Of course, it also is highly desirable that increases in the proportion of the added compound used in the mixture not excessively reduce the clarification point of the mixture.

On the basis of the prior art, it would have been expected that the polarization necessary to achieve a very high positive DC anisotropy would necessarily lead to use of isotropic compounds as additives to LC mixtures. In turn, such compounds would be expected to have a detrimental effect on the clarification point of the mixture. It would be further expected that with compounds of formula (10), no pronounced improvement would be possible such as would be necessary for the important aim of operating LC displays with a voltage of 1.5 V.

SUMMARY OF THE INVENTION

Accordingly, it is an object of the present invention to provide an LC mixture which has a positive DC anisotropy higher than 15 and which, when used in LC displays, permits the use of 1.5 V batteries.

This and other objects of the present invention as will hereinafter become clear have been attained by the surprising finding that with the compounds (1) defined more fully hereinbelow, it is possible to form nematic LC mixtures which permit the operation of twisted nematic displays at voltages on the order of 1.5 V. This is thought to be partly due to the extremely high positive DC anisotropy of the compounds (1) of over 25, and partly to the liquid crystalline or potentially liquid crystalline character of the compounds (1). For example, the compounds (1), particularly in conjunction with nematic LC compounds which themselves have a markedly positive DC anisotropy, for example, of 10 to 20, provide LC mixtures having a high positive DC anisotropy ($\Delta\epsilon \approx 25$), without significantly impairing the clarification point of the mixture. It may even raise its clarification point.

The LC mixture of this invention is characterized in that it contains at least one compound of formula (1) having a positive DC anisotropy value of over 25, in an amount sufficient to impart to the mixture a positive DC anisotropy value of at least about 15, and preferably at least about 25.

The nematic LC mixture of this invention comprises at least one nematic liquid crystal compound and an amount, sufficient to impart a positive DC anisotropy of at least about 15 to said mixture, of at least one liquid crystalline or potentially liquid crystalline compound having a positive DC anisotropy of above about 25, of the formula (1):

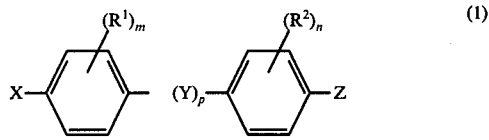

wherein X is a monovalent radical of the formula —NR³R⁴ or —N(R⁵) (CHO); Y is a bivalent radical of the formula —CH=N—, —N=CH—, —N=N—, —CH=CH—, —C(O)O—, —O(O)C—, —C(O)S—, —S(O)C—, —C≡C— or

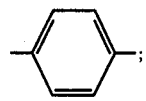

Z is a monovalent radical of the formula —CN, —NO₂—, —SO₂CH₃, —SO₂CF₃ or —NHCOR⁵; R¹ and R² are the same or different and each is fluorine, chlorine, bromine, methyl or hydroxy; R³ and R⁴ are the same or different and each is hydrogen or an alkyl group containing from 1 to 8 carbon atoms; R⁵ is an alkyl group containing from 1 to 8 carbon atoms; p is zero or 1; and m and n are the same or different integers from zero to 4.

DETAILED DESCRIPTION OF THE PREFERRED EMBODIMENTS

The compounds whose $\Delta\epsilon$ is at least 25, which are used for the LC mixtures of this invention, are those of formula (1):

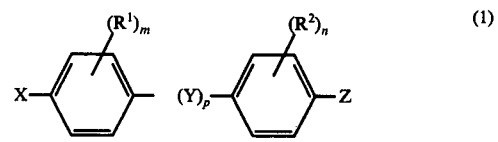

in which X represents a monovalent radical of the formula —NR³R⁴ or —N(R⁵) (CHO); Y a bivalent radical of the formula —CH=N—, —N=CH—, —N=N—, —CH=CH—, —C(O)O—, —(O)C—, —C(O)S—, —S-(OC)—, —C≡C—, or

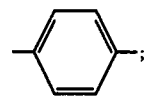

and Z a monovalent radical of the formula —CN, —NO₂, —SO₂CH₃, —SO₂CF₃ or —NHCOR⁵; and R¹ and R² are the same or different, each representing a fluorine, chlorine or bromine atom or a methyl or hydroxyl group; R³ and R⁴ are the same or different, and are hydrogen or an alkyl radical containing from 1 to 8 carbon atoms; p is zero or 1; and m and n are equal or different integers from zero to 4. Straight chain radicals, particularly those containing from 1 to 4 carbon atoms, are preferred as alkyl radicals for R³, R⁴ and R⁵.

Compounds of formula (1), in which X represents a radical of the formula —NHR⁴ or —N(R⁵) (CHO), constitute a special, preferred form of this invention.

It is obvious that the optimum selection of Y, Z, R¹, R², R³, R⁴ and R⁵ or of the numerical values of m and n (when R¹ and R² are not hydrogen atoms) for a given purpose, is influenced by the melting points or clarification points of the particular compounds. In general, by varying Y or R¹ and R², it is possible to lower the melting point in an advantageous manner or, particularly by varying Y, to improve the chemical stability of the respective compounds (1).

As discussed above, some of the compounds (1) are themselves liquid crystalline, while others are potentially liquid crystalline in the sense that they have anisotropic geometry, and, when mixed with compounds which themselves are liquid crystalline, assume the arrangement of the liquid crystal molecules, i.e., the matrix.

Preferred mixtures of the invention contain at least one compound of formula (1) and at least one known nematic LC compound having a clearly positive DC anisotropy, particularly in the form of eutectic mixtures. Such mixtures are suitable as dielectrics for LC display devices having a twisted nematic phase at temperatures up to about 70° C., with operating voltages of about 1.5 V.

Particularly for the purpose of increasing the positive DC anisotropy, the compounds (1) are preferred in mixtures with those known nematic LC compounds which themselves have a clearly positive DC anisotropy of above 2, particularly between 10 and 20, and which are selected from the group of nematic LC compounds of formula of formula (10) in which Y represents one of the groups —CH=CH—, —C≡C—, —CH=N—, —N=N—, —C(O)O— or —C(O)S—, or a single bond; and X and Z represent alkyl, alkoxy, alkylcarbonyloxy, alkyloxylcarbonyloxy, nitrile, or nitro groups. Such compounds (10) are known (see, for example, Demus et al, Flussige Kristalle in Tabellen, VEB Deutscher Verlag fur Grundstoffindustrie, Leipzig 1974).

The production of suitable eutectic mixtures is within the competence of the specialist, and corresponding mixture compositions can be calculated (See, for example, D. Hulme and P. Raynes, J. Chem. Soc. 98, 1974). Furthermore, compounds (1) mixed with one another or with known liquid crystal compounds have an advantageous tendency to form supercooled melts and, consequently, permit greater flexibility in respect of the working temperature of a mixture produced with them.

In a preferred group of compounds (1) the bridge member Y is a bivalent group of the formula —C(O)O—, —O(O)C—, —C(O)S—, —S(O)C—, —CH=N, —N=CH— or

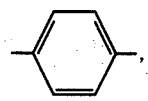

or $p$ is zero.

Compounds (1) in which the electron-attracting group Z is a monovalent radical of the formula —CN, —SO$_2$CH$_3$, —SO$_2$CF$_3$ or NO$_2$ are also preferred. The nitrile group —CN is particularly preferred.

More specifically, in a particularly preferred group of compounds, $m$ and $n$ are equal to zero or 1; $p$ is equal to zero or 1; Y represents the groups —CH=N—, —C(O)O— or —S(O)C—; and Z represents a nitrile group, particularly when the electron-repelling group X is an N-monoalkylamino or N-monoalkylformamido group whose alkyl radical preferably contains from 1 to 8 carbon atoms.

Particularly preferred examples are compounds in which $m$ and $n$ are each equal to zero, $p$ is 0 or 1, Y represents the group —CH=N or —C(O)O—, and Z represents —CN, while X represents an N-methylamino-, N-ethylamino, or N-methylformamido group; i.e., R$^3$ is a hydrogen atom and R$^4$ and R$^5$ are the lower alkyl groups.

Compounds (1), analogous to those of the group just mentioned, wherein X is N-propylamino, N-butylamino, N-ethylformamido, N-propylformamido or N-butylformamido, have been found utilizable for LC mixtures according to this invention, particularly in combination with other compounds (1) and with known compounds of formula (10) wherein the radical X represents an n-alkyl group containing from 1 to 10 carbon atoms, for example, the hexyl radical, Y represents the group —CH=N, Z represents the nitrile group, and $m$ and $n$ are zero.

The compounds (1) of this invention may be obtained by methods known per se, for example known from the abovementioned DT-OS and also from other literature sources such as Eastman Kodak Bulletin, 45 (1973), pages 1 to 11, and DT-OS 2,356,085. One method involves condensation of compounds of formula (2)

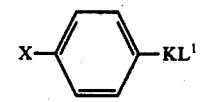

(2)

in which X is defined as for formula (1); K is a component of the group Y, and L$^1$ is a radical adapted to split off, with compounds of formula (3)

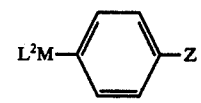

(3)

in which Z is defined as for formula (1), M is a second component of the group Y, and L$^2$ is a second group capable of splitting off.

For the production of the preferred group of compounds (1) in which Y represents the bivalent radical —CH=N—, the p-aldehyde of formula (2a)

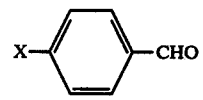

(2a)

can be condensed with the p-amine of formula (3a)

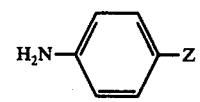

(3a)

This process can be carried out in the manner described in DT patent application P 25 57 267 or in DT-OS 2,443,618, in which case it is simply necessary to modify the group X in the p-aldehyde (2a) in accordance with the desired final structure, for example, by the method described by Vilsmeier in Houben-Weyl, Vol. VII, part 1, page 30. Suitable such aldehydes (2a) are either known as such or can be obtained similarly to the known aldehydes.

It is, however, also possible to start with a compound of formula (4)

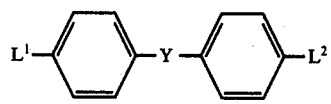

(4)

and to introduce the radicals X and Z in any sequence, the radicals L$^1$ and L$^2$ splitting off.

The compounds of formula (1) of this invention having a nematic phase and an intensely electron-attracting group Z, are preferably used as components of eutectic mixtures. The high clarification point temperatures ($T_c$) of the compounds are advantageous for such mixtures and the threshold voltage of the mixture can be brought to values below 1.1 V with relatively small proportions of compounds (1). The potentially liquid crystalline compounds (1) can be used similarly if high $T_c$ values are not required.

Having generally described this invention, a further understanding can be obtained by reference to certain specific examples which are provided herein for purposes of illustration only and are not intended to be limiting unless otherwise specified.

EXAMPLE 1

By the process described in German patent application P 25 57 267 various p-aldehydes of formula (5)

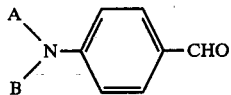  (5)

were condensed with p-aminobenzonitrile. A and B are defined in Table I below. The melting points ($T_m$) and clarification points ($T_c$) of the compounds obtained are likewise shown in Table I.

Table I

| Compound | A | B | $T_m$(° C) | $T_c$(° C) |
|---|---|---|---|---|
| (1-1) | H— | —CH$_3$ | 163.2 | (138.0) |
| (1-2) | HCO— | —CH$_3$ | 159.1 | (134.8) |
| (1-3) | H— | —C$_2$H$_5$ | 154.6 | (129.1) |
| (1-4) | HCO— | —C$_2$H$_5$ | 132.3 | — |
| (1-5) | H— | —C$_3$H$_7$ | 151.7 | — |
| (1-6) | H— | —C$_4$H$_9$ | 129.6 | — |
| (1-7) | HCO— | —C$_4$H$_9$ | 81.2 | — |

From this table it can be seen that the compounds (1-1), (1-2), and (1-3) are monotropic liquid crystals. They have a nematic phase. The compounds (1-4), (1-5), (1-6), and (1-7), are potential liquid crystals and are likewise suitable for raising the Δε value of liquid crystal mixtures. All compounds (1-1) to (1-7) have a Δε of over 25.

Liquid crystal mixtures were produced with the compounds of Table I and the compound (10-1)

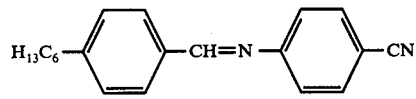  (10-1)

known from DT-OS 2,306,378, the compositions and properties of these mixtures being indicated in Table II.

Table II

| Mixture of compounds | Proportion (mole %) | Threshold voltage $U_{10\%}$ (V) | $T_m$ (° C) | $T_c$ (° C) | Observations |
|---|---|---|---|---|---|
| (10-1) | 95.3 | 1.11 | 29 (calculated) | 64 | Eutectic; remains liquid when supercooled far below the calculated $T_m$ |
| (1-3) | 4.7 | | | | |
| (1-1) | 3.9 | | | 65.5 | Eutectic; remains |
| (1-3) | 4.3 | 1.06 | 26.5 (calculated) | | liquid when supercooled far below the calculated $T_m$ |
| (10-1) | 91.8 | | | | |
| (1-1) | 16.6 | 0.97 | | 75 | |
| (10-1) | 83.4 | | | | |

EXAMPLES 2-18

Using the compounds discussed in Example 1 and also other compounds of formula (1), namely those of the formula

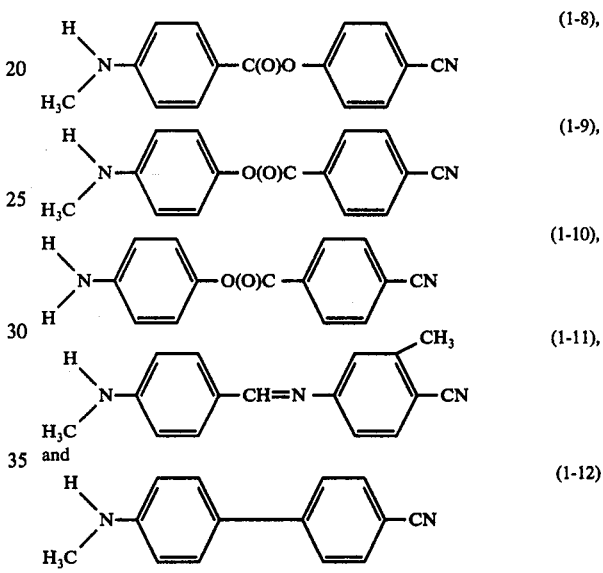

liquid crystal mixtures were prepared with other known compounds of formula (10), which are indicated in the following Table III.

Table III

| | Formula (10) | | |
|---|---|---|---|
| X | Y | Z | Compound |
| H$_{13}$C$_6$O— | —CH=N— | —CN | (10-2) |
| H$_{15}$C$_7$C(O)O— | —CH=N— | —CN | (10-3) |
| H$_{11}$C$_5$— | —C(O)O— | —CN | (10-4) |
| H$_{13}$C$_6$— | —C(O)O— | —CN | (10-5) |
| H$_{15}$C$_7$— | —C(O)O— | —CN | (10-6) |
| H$_{17}$C$_8$— | —C(O)O— | —CN | (10-7) |
| (CH$_3$)$_2$N— | —C(O)O— | —CN | (10-8) |

The melting and clarification points of the compounds are indicated in Table IV below.

Table IV

| $T_m$ (° C) | $T_c$ (° C) | Compound |
|---|---|---|
| 184.9 | (145.9) | (1-8) |
| 138.1 | (129.9) | (1-9) |
| 186.8 | (113) | (1-10) |
| 152.6 | — | (1-11) |
| 199.3 | (180) | (1-12) |
| 54.5 | 101 | (10-2) |
| 54 | 97.5 | (10-3) |
| 60.5 | (56.5) | (10-4) |
| 45 | 43 | (10-5) |
| 44 | 56.5 | (10-6) |
| 46.5 | 53.5 | (10-7) |
| 153 | — | (10-8) |

In Table V below the compositions of the mixtures in mole proportions and the clarification point temperatures are indicated.

Table V

| Example No. | (10-2) | (10-3) | (10-4) | (10-5) | (10-6) | (10-7) | (10-8) | (1-1) | (1-2) | (1-3) | (1-5) | (1-6) | (1-8) | $T_c$ (° C) |
| --- | --- | --- | --- | --- | --- | --- | --- | --- | --- | --- | --- | --- | --- | --- |
| 2 | 0.612 | | | | | | 0.216 | | | | 0.062 | 0.110 | | 100 |
| 3 | 0.602 | | | | | | 0.214 | | | | | 0.076 | 0.108 | 96 |
| 4 | | 0.598 | | | | | 0.222 | | | | 0.065 | 0.115 | | 98 |
| 5 | | 0.586 | | | | | 0.220 | | | | | 0.080 | 0.113 | 93 |
| 6 | | | | 0.652 | | | 0.201 | 0.049 | | | | | 0.097 | 66 |
| 7 | | | | | 0.680 | | 2.202 | 0.050 | | | | 0.069 | | 72 |
| 8 | | | | 0.692 | | | 0.207 | | | | | | 0.102 | 62 |
| 9 | | | | | | 0.686 | 0.210 | | | | | | 0.104 | 66 |
| 10 | 0.650 | | | | | | 0.224 | 0.060 | | 0.066 | | | | 107 |
| 11 | 0.639 | | | | | | 0.222 | 0.059 | | | | 0.081 | | 102 |
| 12 | 0.616 | | | | | | 0.217 | 0.057 | | | | | 0.110 | 101 |
| 13 | 0.627 | | | | | | 0.219 | | | 0.041 | | | 0.112 | 100 |
| 14 | | | | | | 0.632 | 0.202 | | | | | 0.069 | 0.098 | 66 |
| 15 | | | 0.592 | | | | 0.224 | | | | 0.066 | | 0.117 | 74 |
| 16 | | | 0.582 | | | | 0.222 | | | | | 0.081 | 0.115 | 69 |
| 17 | | | | | 0.660 | | 0.199 | 0.048 | | | | 0.067 | 0.025 | 74 |
| 18 | | | 0.549 | | | | 0.213 | 0.055 | | | | 0.076 | 0.107 | 73 |

Having now fully described the invention, it will be apparent to one of ordinary skill in the art that many changes and modifications can be made thereto without departing from the spirit or scope of the invention as set forth herein.

What is claimed as new and intended to be secured by letters patent is:

1. A nematic liquid crystal mixture comprising at least one nematic liquid crystal compound and an amount, sufficient to impart a positive Dielectric Constant anisotropy of at least about 15 to said mixture, of at least one liquid crystalline or potentially liquid crystalline compound of the formula (1)

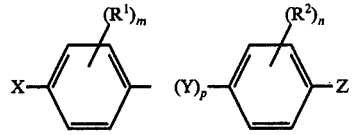

wherein X is a monovalent radical of the formula —NHR⁴ or —N(R⁵) (CHO); Y is a bivalent radical of the formula —CH═N—, —N═CH—, —N═N—, —CH═CH—, —C(O)O—, —O(O)C—, —C(O)S—, —S(O)C—, —C≡C— or

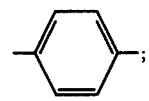

Z is a monovalent radical of the formula —CN, —NO₂, —SO₂CH₃, —SO₂CF₃ or —NHCOR⁵; R¹ and R² are the same or different and each is fluorine, chlorine, bromine, methyl or hydroxyl; R⁴ is an alkyl group containing from 1 to 8 carbon atoms; R⁵ is an alkyl group containing from 1 to 8 carbon atoms; p is zero or 1; and m and n are the same or different integers from zero to 4.

2. The mixture of claim 1, wherein Y is a bivalent group of the formula —C(O)O—, —O(O)C—, —C(O)S—, —S(O)C—, —CH═N—, —N═CH— or

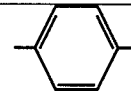

3. The mixture of claim 1, wherein Y is —CH═N—, —C(O)O— or a single bond.

4. The mixture of claim 1, wherein Z is —CN, —SO₂CH₃, —SO₂CF₃ or —NO₂.

5. The mixture of claim 1, wherein Z is the nitrile group.

6. The mixture of claim 1, wherein m and n are zero.

7. The mixture of claim 1, wherein said nematic liquid crystal mixture contains at least two compounds of formula (1).

8. The mixture of claim 1, wherein p is 0.

9. A nematic liquid crystal mixture comprising at least one nematic liquid crystal compound and an amount, sufficient to impart a positive Dielectric Constant anisotropy of at least about 15 to said mixture, of at least one liquid crystalline or potentially liquid crystalline compound of the formula (1)

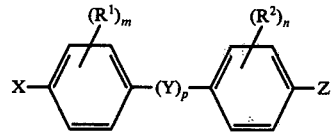

wherein X is the monovalent radical of the formula —N(R⁵)(CHO); Y is a bivalent radical of the formula —CH═N—, —N═CH—, —N═N, —CH═CH—, —C(O)O—, —C(O)S—, —S(O)C—, —C≡C— or

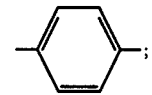

Z is a monovalent radical of the formula —CN, —NO₂, —SO₂CH₃, —SO₂CF₃ or —NHCOR⁵; R¹ and R² are the same or different and each is fluorine, chlorine, bromine, methyl or hydroxyl; R⁵ is an alkyl group containing from 1 to 8 carbon atoms; p is zero or 1; and m and n are the same or different integers from zero to 4.

10. The mixture of claim 9, wherein Y is a bivalent group of the formula —C(O)O—, —O(O)C—, —C(O)S—, —S(O)C—, —CH═N—, —N═CH— or

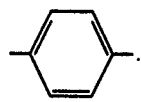

11. The mixture of claim 9, wherein Y is —CH=N—, —C(O)O— or a single bond.

12. The mixture of claim 9, wherein Z is —CN, —SO$_2$CH$_3$, —SO$_2$CF$_3$ or —NO$_2$.

13. The mixture of claim 9, wherein Z is the nitrile group.

14. The mixture of claim 9, wherein $m$ and $n$ are zero.

15. The mixture of claim 9, wherein said nematic liquid crystal mixture contains at least two compounds of formula (1).

16. The mixture of claim 9, wherein $p$ is zero.

* * * * *